2 Sheets—Sheet 1.

J. OLD.

Assignor by mesne assignments to M. J. OLD.

JOINTS AND COUPLINGS FOR PIPES, &c.

No. 7,493. Reissued Feb. 6, 1877.

Witnesses:
H. Adams
L. Gardner

Inventor:
James Old,
Per
Johnston & Dunn
His Attorneys

2 Sheets—Sheet 2.

J. OLD.

Assignor by mesne assignments to M. J. OLD.

JOINTS AND COUPLINGS FOR PIPES, &c.

No. 7,493. Reissued Feb. 6, 1877.

Witnesses:
H. Adams.
W. C. Dunn

Inventor:
James Old
By Johnston & Dunn
His Attorneys
Washington D.C.

UNITED STATES PATENT OFFICE.

JAMES OLD, OF ALLEGHENY, PA., ASSIGNOR, BY MESNE ASSIGNMENTS, TO MARTHA J. OLD, OF SAME PLACE.

IMPROVEMENT IN JOINTS AND COUPLINGS FOR PIPES, &c.

Specification forming part of Letters Patent No. 50,619, dated October 24, 1865; reissue No. 7,493, dated February 6, 1877; application filed August 23, 1876.

*To all whom it may concern:*

Be it known that I, JAMES OLD, of the city of Allegheny, in the county of Allegheny and State of Pennsylvania, have invented certain new and useful Improvements in Joints and Couplings for Pipes, &c., which improvements are fully set forth and described in the following specification, reference being had to the accompanying drawings, forming part of the same.

My invention relates to improvements in the construction of couplings for pipes, tubing, &c., and the manner of connecting the pipe and coupling together.

The object of this invention is to strengthen the connection of the pipe and coupling by a method and by devices hereinafter fully described.

Figure 1:
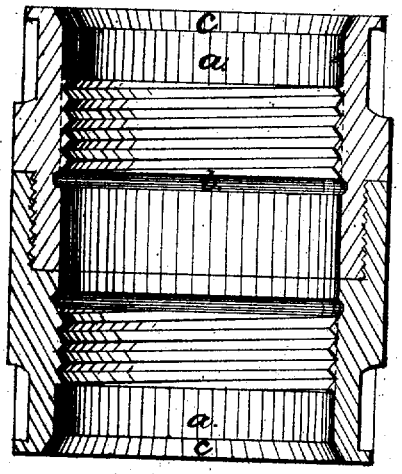
Figure 2:
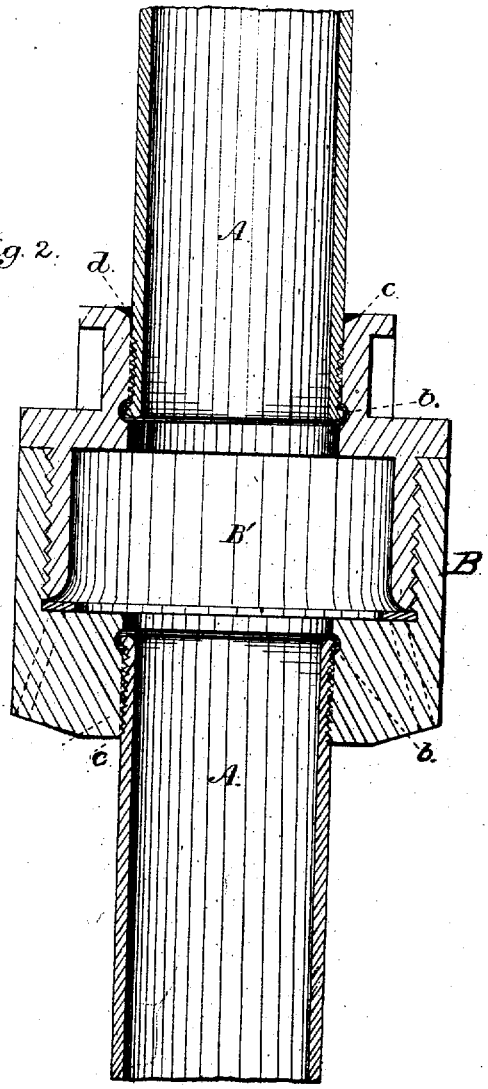
Figure 3:
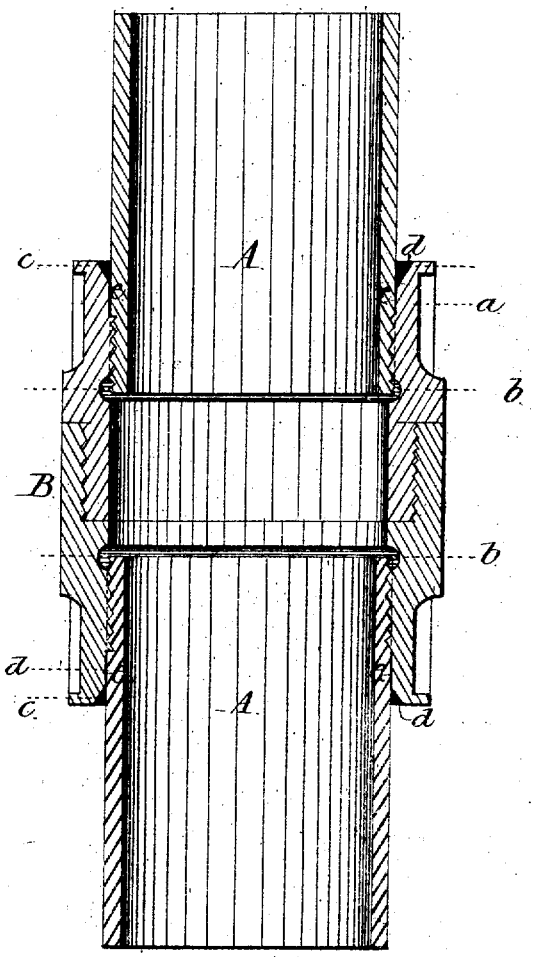

In the accompanying drawings, forming part of this specification, Figure 1 represents a longitudinal section of a pipe-coupling. Figs. 2 and 3 represent the coupling with sections of pipe connected therewith.

Referring to the drawings, A A represent the ordinary wrought-iron pipes used for artesian wells, pipe-lines, &c., having an exterior diameter equal to the diameter of the socket of the coupling in the cut of the screw-threads. These pipes are connected together by a coupling, B, of which there are two forms shown, one in Fig. 2, having a valve-chamber, B′, and the other without such chamber. In the socket of the coupling the female screw-threads are turned off for the distance of about a quarter of an inch from the ends to a depth about equal to that of the screw-threads, forming a rabbet, *a*. The diameter of this rabbet is sufficiently great to admit the pipe A into the coupling for a distance beyond the termination of the male screw-threads equal to the extension of the rabbet toward the transverse axis of the coupling, or, in other words, for the distance of about a quarter of an inch of its unthreaded surface. This arrangement permits the pipe to be entered into the coupling so that its unthreaded surface will be below the end of it, and as a result the part of the pipe which has to bear the strain, when it is subjected to any lateral movement, is transferred from the threaded surface to a point beyond the termination of the male screw-threads, and this is accomplished without any reduction of the diameter of the pipe, so that the strain is borne where the greater strength of the pipe resides. The utility of this will be apparent when it is remembered that in pipes and tubing any circumferential abrasion weakens them, so that they are unable to resist any great degree of lateral strain or pressure when coupled together.

The inner edge of the socket of the coupling is turned out, forming a depression, *c*, so that when the pipe is entered into the coupling a channel is made around it. *d* indicates solder, which is placed in the channel surrounding the pipe, so as to fill all the space between it and the coupling. This packs the joint and fastens the pipe securely to the coupling.

In addition, these improvements produce another and important effect as a result of sinking the pipe with its full diameter into the end of the coupling, so that its unthreaded surface having the full strength of the pipe, will be within the coupling. This is a bearing-surface supplied for the unthreaded surface of the pipe within the coupling, which extends from the bottom of the rabbet to the top of the solder surrounding the pipe, as shown at *e* in Figs. 2 and 3. This furnishes a support for the unthreaded surface of the pipe within the coupling. *b* is a groove in the interior of the coupling, into which the expanded end of the pipe rests, and thus secures the pipe to the coupling.

Having thus described my invention, what I claim is—

1. As an improvement in couplings for pipes, the method hereinbefore described for strengthening the connection thereof—that is to say, sinking the pipe into the coupling until its unthreaded surface, without any reduction of its diameter, occupies a rabbet in the end of the coupling, and is supported therein so as to bear any lateral movement or strain to which it may be subjected, substantially as hereinbefore described, and for the purpose set forth.

2. As an improvement in couplings for pipes, the coupling B, provided with the rabbets *a a* in the ends thereof, having a depth about equal to that of the screw-threads of the coupling, in combination with the pipes A A, the diameter of which does not exceed that of the socket of the coupling on the cut of the screw-threads, whereby, when the pipes are entered into the coupling their unthreaded surfaces, just beyond the termination of the screw-threads, are admitted into the coupling without any diminution of their diameters, substantially as hereinbefore described, and for the purpose set forth.

3. As an improvement in couplings for pipes, the coupling B, having bearing-surfaces in the ends thereof, in combination with the pipes A A, the unthreaded surfaces of which are entered into the coupling without any diminution of the diameter of the pipe, substantially as hereinbefore described, and for the purpose set forth.

In testimony whereof I have hereunto set my hand this 7th day of August, A. D. 1876.

JAMES OLD.

Witnesses:

ANDREW HUMBERT,
W. C. DONN.